United States Patent [19]

Rizzi et al.

[11] Patent Number: 5,328,708
[45] Date of Patent: Jul. 12, 1994

[54] ROAST GROUND COFFEE WITH DEFATTED SPENT COFFEE GROUNDS

[75] Inventors: George P. Rizzi; Roger W. Gutwein, both of Cincinnati, Ohio

[73] Assignee: The Procter & Gamble Company, Cincinnati, Ohio

[21] Appl. No.: 947,857

[22] Filed: Sep. 18, 1992

Related U.S. Application Data

[63] Continuation-in-part of Ser. No. 809,367, Dec. 18, 1991, abandoned.

[51] Int. Cl.$^5$ .............................................. A23F 5/00
[52] U.S. Cl. ................................ 426/388; 426/594; 426/595; 426/430
[58] Field of Search ............... 502/401, 404; 426/594, 426/595, 388, 430

[56] References Cited

U.S. PATENT DOCUMENTS

| | | |
|---|---|---|
| 1,930,257 | 10/1933 | Stelkens . |
| 3,625,703 | 12/1971 | Ericson . |
| 3,644,122 | 2/1972 | Yeransian ..................... 426/388 X |
| 3,705,810 | 12/1972 | Lendvay . |
| 4,048,345 | 9/1977 | Katz ..................... 426/432 |
| 4,278,696 | 7/1981 | Magnolato ..................... 426/422 |
| 4,280,830 | 7/1981 | Ferguson et al. ..................... 71/25 |
| 4,793,990 | 12/1988 | Grollier et al. ..................... 424/59 |

FOREIGN PATENT DOCUMENTS

| | | | |
|---|---|---|---|
| 78618 | 5/1983 | European Pat. Off. | ....... A23F 5/18 |
| 78650 | 5/1983 | European Pat. Off. | ....... A23F 5/18 |
| 2283798 | 11/1990 | Japan . | |

OTHER PUBLICATIONS

English Abstract of Japan Patent Document JP 59179034, Oct. 11 1984, Derwent Publications Ltd., Derwent data base accession No. 84-291172/47.

English Abstract of Japan Patent Document JP 60014829, Jan. 25, 1985, Derwent Publications Ltd., Derwent data base accession No. 85-058774/10.

English Abstract of E. German Patent Document 268150, May 24, 1989, Derwent Publications Ltd., Derwent data base accession No. 89-310013/43.

English Abstract of E. German Patent Document 268151, May 24, 1989, Derwent Publications Ltd., Derwent data base accession No. 89-310014/43.

Primary Examiner—Joseph Golian
Attorney, Agent, or Firm—Ronald L. Hemingway; William J. Winter

[57] ABSTRACT

Lipids are removed from spent coffee grounds using certain lipophilic solvents or series of solvents. The resulting defatted spent coffee grounds contain less than about 2% lipids. The defatted spent coffee grounds act as an adsorbent for bitter coffee flavors and burnt coffee aromas. This adsorbent can be added to roast ground coffee, preferably low quality or dark roasted coffee, to reduce burnt aromas and bitter flavors associated with the corresponding brewed coffee or coffee extract.

8 Claims, No Drawings

ROAST GROUND COFFEE WITH DEFATTED SPENT COFFEE GROUNDS

RELATED APPLICATION

This is a continuation-in-part of application Ser. No. 809,367 filed Dec. 18, 1991, abandoned.

TECHNICAL FIELD

The present invention relates to coffee compositions comprising roast ground coffee beans and defatted spent coffee grounds, which produces a brewed coffee or coffee extract having reduced burnt aromas and reduced bitter flavors. This invention also relates to defatted spent coffee grounds as an adsorbent for reducing burnt coffee aromas and bitter coffee flavors and a method of making the adsorbent.

BACKGROUND OF THE INVENTION

There are many well known methods of changing or improving the flavor of brewed coffee or coffee extract. It has long been the goal of many such methods to improve coffee flavor without sacrificing the yield and convenience of conventional high temperature (i.e., temperature of aqueous extraction exceeding about 70° C., 158° F.) coffee extraction. Generally, high yield and high temperature extractions are convenient and economical but compromise coffee flavor. Consumers prefer the convenience of conventional brewing devices (i.e., percolators, electric percolators, drip coffee makers, automatic drip coffee makers), all of which use high temperature extraction. In the manufacture of soluble coffees, industry prefers the economics of high temperature, counter current extractions. Therefore, to be of any practical use to consumers or industry, methods of improving coffee flavor must also produce an acceptable extraction yield without sacrificing the convenience and economic benefit associated with high temperature coffee extraction.

Selective extraction is one general approach to improving the flavor of brewed coffee or coffee extract. According to this approach, a preferred ratio of bad to good coffee flavors are extracted from roast ground coffee. Ideally, this selective extraction improves the overall flavor of brewed coffees or coffee extracts without compromising its flavor strength or extraction yield.

Two well known selective extraction methods are low temperature extraction and selective extraction via adsorbents. Although both methods are known to improve coffee flavor, it is also known that each method has serious deficiencies.

It has long been known that low temperature extraction of roast ground coffee produces a brewed coffee or coffee extract having an improved flavor. As early as 1880, U.S. Pat. No. 228,889 to Gue et al. disclosed a low temperature extraction of coffee. Likewise, U.S. Pat. No. 3,700,466 to Bergeron et al., issued Oct. 24, 1972, discloses the advantages of low temperature aqueous extraction of roast ground coffee. These low temperature extractions, whether brewed coffee or coffee extract, have a preferred flavor relative to conventional high temperature extractions. For example, toddy coffee (low temperature brewed coffee) has been described as mild and aromatic with a sweet, caramel-like taste. The preferred flavor character of toddy coffee is based on relatively high levels of certain desirable coffee flavor components. These desirable components include aldehydes, diketones, pyrazines, and caramel compounds such as furaneol. The preferred flavor character of toddy coffee is also due to a much lower level of certain undesirable coffee flavor components. These undesirable flavor components include the guaiacols, as well as other phenolic compounds.

Low temperature extraction, whether by counter current methods of making soluble coffee or by brewing toddy coffee, therefore, selectively removes more good flavor components relative to bad flavor components. However, these low temperature extractions sacrifice yield for improved flavor. For example, extraction yield for toddy coffee is about 15% while conventional high temperature brewing produces about a 20–30% yield. Counter current high temperature extraction in the manufacture of soluble coffees produces about a 50–60% yield while low temperature counter current extraction yields considerably less. It would be desirable to have the preferred flavor of low temperature extracts but with the yield of conventional high temperature extraction.

Also well known is the use of adsorbents in coffee to improve the flavor of brewed coffee or coffee extract. Unlike low temperature extraction, adsorbents accommodate high temperature conditions and also preferably adsorb a favorable ratio of bad flavor components to good flavor components without sacrificing yield and convenience. Adsorbents used in roast ground coffee include activated carbons (i.e., activated charcoals), carbohydrates and carbohydrate polymers (i.e., alginic acid), synthetic polyamides (i.e., insoluble polyvinylpyrrolidone), certain mineral substances (i.e. aluminum oxides, silica gel), and proteinaceous materials (i.e., chitosan, chitan).

These prior art adsorbents have been used in various ways to improve the flavor of brewed coffee or coffee extracts. Some have been added to extraction columns in industry, to the extract from extraction columns, to packaged roast ground coffee marketed for consumer use, or to the structure of coffee filters used in conventional brewing devices. These adsorbents improve the flavor of brewed coffee or coffee extract by either adsorbing (and therefore removing) a favorable ratio of bad flavor components to good flavor components, or by adsorbing good flavor components during storage and releasing them upon extraction.

The prior art discloses various ways of using adsorbents to improve coffee aroma and flavor. Japanese Patent Application 59179034, published Oct. 11, 1984, discloses the use of amino-polysaccharide adsorbents to remove mutagenic substances from brewed coffee by incorporating the adsorbents in the fabric of, or placed between, coffee filters. EAST German Patent Application 268151, Published May 24, 1989, discloses the use of silica gel and zeolites as adsorbents added directly to packaged roast ground coffee so as to stabilize and retain coffee aroma and flavor. U.S. Pat. No. 1,930,257 to Stelkens, issued Oct. 10, 1933, also discloses adsorbents added directly to packaged roast ground coffee, the adsorbent being activated charcoals. U.S. Pat. No. 3,625,703 to Ericson, issued Dec. 7, 1971, discloses a roast ground coffee with dried vegetable matter that produces a brewed coffee having less oil and acid.

Historically, adsorbents added to coffee products have had limited success. Besides being expensive, adsorbents frequently adulterate the coffee beverage (i.e., adsorbent particles pass into the coffee beverage) and add an undesirable flavor or texture to the coffee.

It is therefore an object of this invention to provide a coffee composition that results in brewed coffee or coffee extract with reduced burnt aromas and reduced bitter flavors.

It is a further object of this invention to provide an adsorbent that is inexpensive, unadulterating, tasteless, and selective for bad coffee flavor notes.

These and other objects of this invention will become obvious from the description herein.

SUMMARY OF THE INVENTION

This invention relates to a selective adsorbent, and a coffee composition containing the adsorbent, that when the composition is extracted by conventional methods, produces brewed coffee or coffee extract with reduced burnt aromas and reduced bitter flavors. The composition of the present invention comprises roast ground coffee beans and the selective adsorbent of the present invention (defatted spent coffee grounds), the weight ratio of roast ground coffee to defatted spent coffee grounds being from about 5:1 to about 40:1. The selective adsorbent of the present invention is the product obtained by the process comprising; obtaining spent coffee grounds as a by-product of soluble coffee manufacturing, contacting the grounds with a single phase lipophilic solvent or a series of single phase lipophilic solvents selected from the group consisting of ethanol, miscible mixtures of ethanol and water, miscible mixtures of chloroform, methanol and water, ethanol followed by ethyl acetate followed by water, and miscible mixtures of ethanol and water followed by miscible mixtures of ethyl acetate and water followed by water, mixing the resulting slurry for a time sufficient to remove from the coffee grounds substantially all lipids (not more than 2% lipids remaining, based on dry weight of defatted spent coffee grounds), separating the grounds from the solvent, and then removing residual solvent from the grounds.

DEFINITIONS

The term "spent coffee grounds" or "SCG's" as used herein means the residue of coffee grounds remaining after aqueous extraction of roast ground coffee; for example, coffee grounds obtained as a by-product of soluble coffee manufacturing.

The term "defatted spent coffee grounds" or "DFG's" as used herein means spent coffee grounds that contain from zero to about 2% lipids based on the dry weight of the defatted spent coffee grounds.

The term "yield" as used herein means the weight percent of the coffee beans or roast ground coffee removed during aqueous extraction.

The term "high temperature extraction" as used herein means aqueous extraction of roasted coffee beans or roast ground coffee, the water temperature exceeding about 70° C. (158° F.).

The term "low temperature extraction" as used herein means aqueous extraction of roasted coffee beans or roast ground coffee, the water temperature being below about 70° C. (158° F.).

The term or symbols for "percent" as used herein refer to weight-weight percent unless otherwise indicated.

The term "coffee extract" as used herein means a liquid extract of roast ground coffee, or a dried product of the extract, obtained during the manufacture of soluble coffee.

The term "brewed coffee" as used herein means a coffee beverage obtained by aqueous extraction of roast ground coffee using conventional brewing devices (i.e., percolators, electric percolators, drip coffee makers, automatic drip coffee makers).

DETAILED DESCRIPTION OF THE INVENTION

According to the present invention, it has now been found that defatted spent coffee grounds (DFG's) function as an inexpensive adsorbent that selectively reduces burnt coffee aromas and bitter coffee flavors without contaminating the coffee beverage or sacrificing coffee yield. When DFG's are added to roast ground coffee, the resulting composition can be extracted by conventional hot water methods to produce a brewed coffee or coffee extract with an overall flavor similar to that produced by low temperature extractions and a yield equal to that achieved by conventional high temperature extraction.

The flavor and/or aroma of most roast ground coffees will be affected to some extent by DFG's since most coffees have a bitter flavor component and/or a burnt aroma component that can be reduced by DFG adsorption. Preferably, the DFG'S are used with low quality coffee or blends containing a low quality coffee where bitter flavors and burnt aromas are often undesirably strong. The DFG's can also be used with dark roasted coffee to reduce burnt aromas.

According to the present invention, spent coffee grounds (SCG's) are defatted and added to roast ground coffee beans. The DFG's act as selective adsorbents for burnt aromas and bitter flavors during extraction. These adsorbents are inexpensive since SCG's are produced in large amounts during the manufacture of soluble coffee and are often regarded as waste material.

The present invention, therefore, relates to a novel adsorbent (DFG's), and a coffee composition comprised of roast ground coffee beans and the novel adsorbent (DFG's), that when the coffee composition is extracted, results in brewed coffee or coffee extract with reduced burnt aromas and reduced bitter flavors. The DFG's in the coffee composition act as selective adsorbents during extraction, removing by adsorption certain bad flavor and aroma attributes found in the roast ground coffee component of the coffee composition.

The invention is practiced by use of specific adsorbents (DFG's) that can remove a collection of undefined coffee components during extraction, producing a coffee with reduced burnt aromas and reduced bitter flavors. Consistent with this approach, the brewed coffee or coffee extract resulting from the present invention is distinguished from conventional brewed coffee or coffee extracts and compared to low temperature extractions by sensory evaluation of flavor and aroma.

A. Preparation of Defatted Spent Coffee Grounds (DFG's)

DFG's are extracted, defatted, and dried coffee grounds that contain approximately 10-15% protein. Since some prior art adsorbents used in coffee contain a large protein component, it is believed that removal of lipids from SCG's according to the process of the present invention exposes protein within the grounds, allowing the proteins to contact aqueous extraction mediums and adsorb flavor components from the medium.

Other unknown mechanisms may also contribute to the selective adsorption properties of the particle DFG's used in this invention since some DFG's do not adsorb bad or undesirably strong coffee flavors. It is not enough that lipids are removed from the SCG's. To be effective, the lipids must be removed according to the process specified herein. It has been found important to select certain solvents for removal of lipids from the SCG's in order to achieve the desired effect on coffee flavor and aroma in brewed coffee or coffee extract.

SCG's, the source of DFG's in the invention, are derived from any source but preferably derived as a by-product of soluble coffee manufacturing. SCG'S contain less than about 1% soluble coffee solids. SCG's from this source are often discarded as waste, making this a plentiful, inexpensive source of SCG's.

Soluble coffees are usually produced by counter current extraction mechanisms well known to those skilled in the art. Typically, an aqueous extraction medium at temperatures from about 65° C. (149° F.) to about 175° C. (330° F.) passes through a series of extraction columns filled with roast ground coffee with fresh aqueous extraction medium starting at the column with the most extracted roast ground coffee, moving sequentially through the series of columns, and eventually through the last column of fresh roast ground coffee. The extract is then collected, a new column of fresh roast ground coffee is added to the end of the column sequence, and the first column is discarded as spent coffee grounds. The spent coffee grounds are released from the extraction column by opening the hot, pressurized column and blowing the pressurized spent grounds into a holding vessel. Many variations of the counter current method have been described, as well as noncounter current methods of manufacturing soluble coffee, all of which provide an acceptable source of SCG's for the present invention.

Although the use of adsorbents in coffee processing is well known, prior art adsorbents are typically expensive. By contrast, DFG's as the adsorbents in the present invention are relatively inexpensive. SCG's, the source of DFG's, are a waste product in the manufacture of soluble coffee. As such, DFG's are a uniquely inexpensive adsorbent obtained by an inexpensive processing of an abundant, inexpensive material (SCG's).

Preferably, the SCG's are immediately removed from the extraction columns, trying to reduce the time said SCG's are exposed to oxidizing conditions. SCG's contain a large lipid component which can be easily oxidized if the grounds are left in contact with air prior to being processed according to the present invention. Oxidation increases the likelihood of developing an adsorbent aftertaste on the eventual product of the invention.

The SCG's can be initially dried before contacting with a defatting solvent. This initial drying is done when the defatting solvent happens to be immiscible with the moisture in the SCG's. Otherwise, it is preferred that SCG's not be initially dried since the drying increases the likelihood of oxidation and also makes subsequent defatting more difficult. It is theorized that dried SCG's have a contracted structure making lipid removal difficult.

If SCG's are initially dried, by convenience or necessity, the drying operation (evaporation) is accomplished by warming the SCG's, using forced air drying, or drying the SCG's under vacuum. Indeed, any conventional drying process which does not subject the SCG's to temperatures which would degrade the SCG structure or the components making up the SCG structure can be used. However, if SCG's are initially dried, vacuum drying is preferred so as to minimize lipid oxidation.

The SCG's, whether moist or substantially dry, are contacted with a single phase lipophilic solvent or a series of single phase lipophilic solvents, the solvent or solvents being selected from the group consisting of ethanol, miscible mixtures of ethanol and water, miscible mixtures of chloroform, methanol and water, ethanol followed by ethyl acetate followed by water, and miscible mixtures of ethanol and water followed by miscible mixtures of ethyl acetate and water followed by water. Together, the defatting solvent and SCG's form a slurry that is continuously mixed as the solvent extracts substantially all of the lipids from the SCG's. To obtain this result, selection of time, temperature, and amount of any particular solvent are well within the skill of the art.

The type of solvent system used in the defatting process is critical. The solvent system is a single phase lipophilic solvent or a series of single phase lipophilic solvents. Each solvent can be a mixture of solvents. Although a lipophilic solvent is needed to extract the lipids, some lipophilic solvents simply do not produce DFG's with adequate selective adsorption properties to remove bad or undesirably strong coffee flavors during coffee extraction. Also, some lipophilic solvents are unacceptable since they leave an unpleasant aftertaste on the DFG's. In accordance with the present invention, it has been found that solvents (or series of solvents) which produce DFG's with effective adsorption properties, and also have insignificant aftertaste, are those selected from the group consisting of ethanol, miscible mixtures of ethanol and water, miscible mixtures of chloroform, methanol and water, ethanol followed by ethyl acetate followed by water, and miscible mixtures of ethanol and water followed by miscible mixtures of ethyl acetate and water followed by water. For a series of solvents, the sequence of solvents is selected such that the first solvent or solvents are more polar than later solvents in the series. Relative polarities of solvents are well known to those skilled in the art.

The most preferred solvent is a series of solvents, the first solvent in the series being ethanol, the second solvent being a miscible mixture of ethyl acetate and water, and the third solvent being water. This series of solvents is also preferred since it produces DFG's having virtually no aftertaste even when the DFG's are used in amounts exceeding that found in a 5:1 ratio of roast ground coffee to DFG's. Furthermore, these solvents are easily removed from DFGs to acceptable levels by differential pressure desolventization as disclosed in U.S. Pat. No. 4,486,453 to Morrison et al., issued Dec. 4, 1984 (assigned to Procter & Gamble) followed by conventional drying.

To remain miscible at 55° C. (131° F.), a mixture of ethyl acetate and water should contain less than about 7% water. A mixture of ethanol and water is miscible in all proportions at 55° C. (131° F.).

The slurry of SCG's and defatting solvent is agitated for an amount of time sufficient to extract substantially all lipids in the SCG's. Any conventional mixing device can be used to hold and mix the slurry.

The solvent system of the slurry is then separated from the coffee grounds by filtration, centrifugation, or any other conventional means. Once the excess solvent has been isolated, the coffee grounds are washed by fresh defatting solvent, repeating the washings until the washing solvent is substantially free of coffee ground coloration. The coffee grounds, now substantially defatted, are immediately removed from the separating device so that residual solvent in the separated grounds can be removed. Desolventization and drying of the separated grounds typically involves a single process of conventional drying (i.e., warming DFG's, air drying, vacuum drying). When the solvent series includes ethyl acetate, desolventization is preferably accomplished with the differential pressure desolventization process of U.S. Pat. No. 4,486,453 (Morrison et al.) followed by conventional drying.

Differential pressure desolventization, as disclosed by U.S. Pat. No. 4,486,453 (Morrison et al.), is a flash evaporation of ethyl acetate from coffee grounds by means of an alternating cycle of pressure variations and intermittent steam stripping. In the present invention, the cycles are performed in a sealed tumble dryer although any device that provides the conditions of differential pressure desolventization is acceptable.

Drying the DFG's, which then removes substantially all remaining solvent and water, involves warming the DFG's, using forced air drying, or drying the DFG's under vacuum. Indeed, any conventional drying process which does not subject the DFG's to temperatures which would degrade the DFG structure or the components making up the DFG structure can be used. Vacuum drying is preferred since vacuum conditions reduce the likelihood of oxidation any of residual lipids within the DFG's, which can produce an aftertaste in the brewed coffee or coffee extract made from the composition of the invention.

The newly manufactured and dried DFG's appear as a fine brown powder, substantially odorless, tasteless, and lipid free (not more than about 2% lipids based on dry weight of DFG's). This product of the current invention acts as an adsorbent for burnt coffee aromas and bitter coffee flavors and is also added to roast ground coffee to form the coffee composition of the present invention.

B. Composition of Roast Ground Coffee Beans and DFG's

DFG's, substantially free of defatting solvent and water, are added to roast ground coffee beans to form the composition of the current invention. The DFG's and roast ground coffee beans are combined by conventional dry mixing methods. The weight ratio of roast ground coffee to DFG's should be between from about 5:1 to about 40:1, preferably from about 10:1 to about 20:1. A composition with a ratio more than 40:1 receives an insignificant benefit from the DFG's, and a composition with a ratio less than 5:1 produces a weak coffee with some adsorbent aftertaste.

The size of DFG particles should preferably range from about 20 mesh U.S. Standard Sieve Series to about 200 mesh U.S. Standard Sieve Series, although particle sizes outside this range would also be acceptable. Within this range, particle size bears substantially no relationship to the efficacy of the present invention. When prepared as directed above, the DFG particles are typically small, appearing as a fine brown powder. As DFG particle size varies within the above range, surface area also varies but efficacy as an adsorbent for bad coffee flavors remains substantially unchanged.

The roast ground coffee beans can be derived from low, intermediate or high quality coffee beans, or blends thereof, preferably from low quality coffees or blends containing a low quality coffee. Low quality coffee beans have an undesirably or excessively bitter flavor that can be reduced by DFG's. Nonlimiting examples of low quality beans include robustas, low grade naturals such as Haiti XXX, Peru Natural, Salvadors, low grade Brazils, and low grade unwashed Arabicas such as the Ugandans, Indonesians, Ivory Coast, Dominican Republic, Equador, Resacas and Guatemalan TMS.

The coffee composition of the invention can then be used as if it were a conventional roast ground coffee. For example, the coffee composition can be used in the manufacture of soluble coffee, adding the composition to counter current extraction columns so as to produce a coffee extract with reduced burnt aromas and reduced bitter flavors.

Likewise, the coffee composition of the invention can also be used by consumers to make a brewed coffee having reduced burnt aromas and reduced bitter flavors. The coffee composition is packaged the same as a conventional roast ground coffee for the consumer market. The composition does not leave an unpleasant adsorbent aftertaste in the brewed coffee and, most importantly, consumers can obtain the flavor benefit of the invention by conventional brewing methods—hot water extraction using conventional consumer brewing devices (i.e., percolators, electric percolators, drip coffee makers, automatic drip coffee makers).

EXAMPLE 1

Damp spent coffee grounds are obtained as a by-product of the manufacture of soluble coffee, the manufacturing process being a counter current system with multiple extraction columns. The grounds contain less than 1% soluble coffee solids. The hot, moist coffee grounds are immediately released from the first extraction column containing the most extracted coffee grounds, rapidly expelling the grounds from the pressurized (100 psig) column into a holding vessel. The grounds (500 gm) are then immediately transferred to a mixing drum. The drum is a modified crystallizer containing an agitator, a sealed cover, an outer hot water jacket, and a screened drain. Ethanol (4 liters) at 50° C. (122° F.) is slowly added to the drum containing 500 gm of SCG's, agitating the developing slurry while adding the solvent. The slurry is continuously stirred for 4 hours, maintaining a slurry temperature from about 50° C. (122° F.) to about 60° C. (140° F.). The screen drain is opened, releasing the used solvent but retaining the coffee grounds in the drum. A miscible mixture (4 liters) of ethyl acetate and water is added to the drum, agitating the slurry and maintaining the slurry temperature as before, and then releasing the spent solvent from the screen drain. The remaining grounds are washed repeatedly with fresh solvent (miscible mixture of ethyl acetate and water) until the washings are substantially free of coffee coloration. The grounds are then repeatedly washed in a similar manner with water (three additional washings). The grounds are then immediately transferred to a tumble dryer where six pressure differential desolventization cycles are performed (steam rate 130 lb./hr., low pressure 2 psia, high pressure 14.7 psia, cycle time 6 min.). The grounds are immediately transferred to a vacuum oven where the DFG's are dried for 8 hours at 100° C. (212° F.) and at 2 psia. After vacuum drying, 50 gm of the dried DFGs are added to 725 gm of roast ground coffee, thoroughly mixing the fine powdered DFG's throughout the roast ground coffee particles. The composition is then packaged and marketed for consumer use as a coffee composition to be brewed using conventional coffee makers.

EXAMPLE 2

As in Example 1, except that the composition (roast ground coffee and DFGs) is added to counter current extraction columns and processed (extracted) by conventional methods toward the production of soluble coffee.

EXAMPLE 3

SCG's with less than 1% soluble coffee solids are obtained from a countercurrent extraction column. The SCG's are defatted to less than 0.5% lipids using the solvent systems listed in Table 1. The DFG's are then separated from the defatting solvent. Residual solvent is removed from the DFG's. As an approximation of the relative effectiveness of the DFG's as an adsorbent for undesirable coffee flavors/aromas, the DFG's are then each evaluated for their ability to adsorb rebrew coffee solids (RCS) as hereinafter defined.

RCS's are obtained by extracting (via automatic drip coffeemaker) spent coffee grounds with water (approximate temperature 85°-87° C.), the spent grounds having been previously extracted with water at 22° C. The resulting extracts contain 0.975 mg/ml coffee solids referred to herein as rebrew coffee solids. The RCS's have an undesirably bitter, ashy and dirty flavor.

DFG's are added to the RCS extract at DFG:RCS weight ratios of 10:1, 50:1 and 100:1. Extract temperatures are maintained at about 22° C. (72° F.). The extracts with added DFG's are allowed to set for 120 and/or 240 minutes before separating the DFG's from the extracts. Each separated extract is measured for RCS content. The RCS fractions adsorbed by the DFG's are then calculated. Results are shown in Table 1.

TABLE 1

| Defatting solvent | Adsorption Time (min.) | Weight Ratio (DFG:RCS) | Weight Percent RCS adsorbed |
|---|---|---|---|
| A. CHCl3 + MeOH + H2O (69/27/4 v/v/v solvent mixture) | 120<br>240<br>240 | 10<br>50<br>100 | 10.6%<br>38.5%<br>53.4% |
| B. Hex + EtOH (50/50 v/v solvent mixture) | 120 | 10 | 10.4%* |
| C. EtOH + H2O (80/20 v/v solvent mixture) | 120 | 10 | 12.8% |
| D. EtOH > EtAc > H2O (solvent series) | 120<br>240<br>240 | 10<br>50<br>100 | 7.5%<br>27.7%<br>37.0% |
| E. EtOH | 120 | 10 | 7.4% |
| F. EtAc | 120 | 10 | 3.9% |
| G. Hex > EtOH > EtAc > H2O (solvent series) | 120<br>240<br>240 | 10<br>50<br>100 | 3.4%<br>3.4%<br>2.6% |
| H. Hex | 120 | 10 | 1.9% |
| I. IsoP + Acetone + H2O (66/1/33 v/v/v solvent mixture) | 120 | 10 | 1.0% |

TABLE 1-continued

| Defatting solvent | Adsorption Time (min.) | Weight Ratio (DFG:RCS) | Weight Percent RCS adsorbed |
|---|---|---|---|

*unacceptable aftertaste from hexane residue
Note: EtOH (ethanol), EtAc (ethyl acetate with less than about 7% water), MeOH (methanol), CHCl3 (chloroform), Hex (hexane), IsoP (isopropanol), H2O (water)

The Table 1 results show that only certain DFG's adsorb significant amounts of RCS's. DFG's defatted with chloroform+methanol+water, hexane+ethanol, ethanol, ethanol>ethyl acetate>water, or ethanol+water adsorb significant amounts of RCS's. DFG's defatted with hexane+ethanol, however, have an unacceptable hexane aftertaste. DFG's defatted with hexane>ethanol>ethyl acetate>water, hexane or isopropanol+acetone+water do not substantially reduce RCS concentrations and are therefore regarded as being ineffective as adsorbents.

Table 1 shows the differences among DFG's as adsorbents. As DFG:RCS ratios and adsorption times are increased for DFG's produced by chloroform+methanol+water and ethanol>ethyl acetate>water, the amount of RCS's adsorbed also increases For example, DFG's made via the ethanol>ethyl acetate>water solvent series adsorbs 7.5% RCS over 120 minutes at a 10:1 ratio, 27.7% over 240 minutes at a 50:1 ratio, and 37.0% over 240 minutes at a 100:1 ratio. By contrast, DFG's made via the hexane>ethanol>ethyl acetate>water solvent series adsorbs only 2.6% RCS after 240 minutes at a 100:1 ratio.

EXAMPLE 4

Two roast ground coffee samples (Folgers roast ground coffee, manufactured by The Procter & Gamble Company) are evaluated for flavor and aroma. Both contain 43.9 grams of roast ground coffee. One sample also contains 2.5 grams of DFG's. The DFG's are defatted with chloroform+methanol+water (69/27/4 v/v/v mixture). Both samples are brewed in a conventional automatic drip coffee maker with 2000 ml of hot distilled water (approximately 85°-87° C.). The brewed coffee from each sample contains 0.56% coffee solids. Eleven expert panelists evaluate the flavor and aroma of the brewed coffee on a quantitative scale of from 0 to 60. Higher numbers indicate stronger aroma or flavor notes. Evaluation results are shown in Table 2.

TABLE 2

| | R&G Coffee without DFG's | R&G Coffee with 5.7% added DFG's | Statistically Significant Difference* |
|---|---|---|---|
| Aroma | | | |
| burnt | 12.25 | 6.45 | significant |
| ashy | 8.20 | 4.90 | no |
| Flavor | | | |
| bitter | 26.8 | 21.05 | significant |
| burnt | 20.95 | 15.85 | no |
| ashy | 16.00 | 13.10 | no |
| grain | 13.60 | 15.45 | no |
| woody | 1.50 | 4.85 | significant |
| astringent | 23.10 | 22.80 | no |

*Statistically significant difference at 95% confidence level

The Table 2 data show a statistically significant reduction in burnt aroma and bitter flavor for the roast ground coffee containing DFG's. A strong directional reduction is also apparent for burnt flavor and ashy aroma/flavor.

What is claimed is:

1. A process for making defatted spent coffee grounds that can be used as selective adsorbents in reducing burnt coffee aromas and bitter coffee flavors in brewed coffee when combined with roast ground coffee beans, which process comprises the steps of:
   (a) obtaining spent coffee grounds having a soluble coffee solids content of less than about 1% by weight;
   (b) contacting the spent coffee grounds with a single phase lipophilic solvent or series of single phase solvents, to produce defatted spent coffee grounds containing not more than about 2% lipids, said solvent or series of solvents being selected from the group consisting of ethanol, miscible mixtures of ethanol and water, miscible mixtures of chloroform, methanol and water, ethanol followed by ethyl acetate followed by water, and miscible mixtures of ethanol and water followed by miscible mixtures of ethyl acetate and water followed by water; then
   (c) separating the grounds of step (b) from the solvent; and
   (d) removing residual solvent from the separated grounds.

2. The process of claim 1 wherein the defatted spent coffee grounds produced by the process contain not more than about 0.5% lipids.

3. The process of claim 1 wherein a series of single phase solvents is used in step (b), which series is selected from the group consisting of ethanol followed by ethyl acetate followed by water, and miscible mixtures of ethanol and water followed by miscible mixtures of ethyl acetate and water followed by water.

4. A process for making a roasted coffee product which produces brewed coffee having a reduced burnt aroma and a reduced bitter flavor, which process comprises the steps of:
   (a) obtaining spent coffee grounds having a soluble coffee solids content of less than 1% by weight;
   (b) contacting the spent coffee grounds with a single phase lipophilic solvent or series of single phase solvents, to produce defatted spent coffee grounds containing not more than 2% ipids, said solvent or series of solvents being selected from the group consisting of ethanol, miscible mixtures of ethanol and water, miscible mixtures of chloroform, methanol and water, ethanol followed by ethyl acetate followed by water, and miscible mixtures of ethanol and water followed by miscible mixtures of ethyl acetate and water followed by water; then separating the grounds of step (b) from the solvent;
   (c) separating the grounds of step (b) from the solvent;
   (d) removing residual solvent from the separated grounds; and then
   (e) admixing the separated defatted spent coffee grounds of step (d) and roast ground coffee beans in a weight ratio of the roast ground coffee beans to the defatted spent coffee grounds of from about 5:1 to about 40:1.

5. The process of claim 4 wherein the defatted spent coffee grounds produced in step 16(b) contain not more than about 0.5% lipids.

6. The process of claim 5 wherein a series of single phase solvents is used in step 16(b), which series is selected from the group consisting of ethanol followed by ethyl acetate followed by water, and miscible mixture of ethanol and water followed by miscible mixtures of acetate and water followed by water.

7. The process of claim 6 wherein the weight of roast ground coffee beans to defatted spent coffee grounds in step 16(e) is from about 10:1 to about 20:1.

8. The process of claim 7 wherein the roast ground coffee beans comprise roast ground robusta coffee beans.

* * * * *